United States Patent
Wang et al.

(10) Patent No.: US 11,403,303 B2
(45) Date of Patent: Aug. 2, 2022

(54) METHOD AND DEVICE FOR GENERATING RANKING MODEL

(71) Applicant: BEIJING BYTEDANCE NETWORK TECHNOLOGY CO., LTD., Beijing (CN)

(72) Inventors: Yang Wang, Beijing (CN); Ziniu Hu, Beijing (CN); Qu Peng, Beijing (CN); Hang Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 164 days.

(21) Appl. No.: 16/980,897

(22) PCT Filed: Sep. 7, 2018

(86) PCT No.: PCT/CN2018/104683
§ 371 (c)(1),
(2) Date: Sep. 15, 2020

(87) PCT Pub. No.: WO2020/047861
PCT Pub. Date: Mar. 12, 2020

(65) Prior Publication Data
US 2021/0026860 A1    Jan. 28, 2021

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/248* (2019.01); *G06F 17/18* (2013.01); *G06N 5/003* (2013.01)

(58) Field of Classification Search
CPC .. G06F 16/24578; G06F 16/248; G06F 17/18; G06N 5/003; G06N 20/00
See application file for complete search history.

(56) References Cited

U.S. PATENT DOCUMENTS 8,326,815 B2 * 12/2012 Sadagopan ........... G06F 16/951
707/726
8,452,758 B2 * 5/2013 Tong ..................... G06F 16/951
707/751
(Continued)

FOREIGN PATENT DOCUMENTS

CN         106445979 A      2/2017
CN         107402954 A     11/2017

OTHER PUBLICATIONS

International Patent Application No. PCT/CN2018/104683; Int'l Search Report; dated Jun. 5, 2019; 2 pages.

*Primary Examiner* — Noosha Arjomandi
(74) *Attorney, Agent, or Firm* — BakerHostetler

(57) ABSTRACT

The embodiment of the present application discloses a method and a device for generating a ranking model. A specific embodiment of the method includes: acquiring a sample set, executing following training steps: for the samples in the sample set, inputting the query information, the first position document and the second position document in the sample into an initial model, respectively obtaining scores of the input documents, and determining a target value of the sample based on the obtained scores, a clicked bias of a first position and an unclicked bias of a second position, updating the initial model based on the target value of each sample; determining whether the initial model is completely trained; and in response to determining that the initial model is completely trained, determining the updated initial model as the ranking model.

15 Claims, 6 Drawing Sheets

(51) Int. Cl.
   *G06F 16/248*      (2019.01)
   *G06F 17/18*       (2006.01)
   *G06N 5/00*        (2006.01)

(56)            References Cited

U.S. PATENT DOCUMENTS

| | | | |
|---|---|---|---|
| 2009/0037401 A1 | 2/2009 | Li et al. | |
| 2009/0265290 A1* | 10/2009 | Ciaramita | G06N 3/08 |
| | | | 706/12 |
| 2010/0125570 A1* | 5/2010 | Chapelle | G06F 16/951 |
| | | | 707/E17.014 |
| 2010/0318531 A1* | 12/2010 | Gao | G06F 16/337 |
| | | | 707/769 |
| 2011/0208735 A1* | 8/2011 | Gao | G06F 16/951 |
| | | | 707/730 |
| 2011/0270828 A1* | 11/2011 | Varma | G06F 16/951 |
| | | | 707/E17.014 |
| 2012/0191705 A1* | 7/2012 | Tong | G06F 16/951 |
| | | | 707/727 |
| 2012/0271806 A1* | 10/2012 | Leong | G06F 16/9535 |
| | | | 707/706 |
| 2013/0246383 A1* | 9/2013 | White | G06F 16/9535 |
| | | | 707/723 |
| 2013/0246412 A1* | 9/2013 | Shokouhi | G06F 16/9535 |
| | | | 707/E17.084 |
| 2014/0149429 A1* | 5/2014 | Gao | G06F 16/337 |
| | | | 707/748 |
| 2015/0332169 A1* | 11/2015 | Bivens | G06N 20/00 |
| | | | 706/12 |
| 2018/0095967 A1* | 4/2018 | Kota | G06Q 30/0256 |
| 2018/0121429 A1* | 5/2018 | Agrawal | G06F 16/3326 |
| 2019/0019157 A1* | 1/2019 | Saha | G06N 20/00 |
| 2019/0057095 A1* | 2/2019 | Chakravarti | G06N 5/022 |
| 2019/0164084 A1* | 5/2019 | Gulin | G06N 20/20 |
| 2020/0192961 A1* | 6/2020 | Safronov | G06F 16/3349 |
| 2020/0210891 A1* | 7/2020 | Safronov | G06F 16/3349 |
| 2020/0334260 A1* | 10/2020 | Kussmaul | G06F 3/0486 |
| 2021/0110428 A1* | 4/2021 | Lu | G06Q 30/0243 |
| 2022/0092095 A1* | 3/2022 | Shukla | G06F 16/3347 |
| 2022/0121696 A1* | 4/2022 | Mehrotra | G06N 3/0454 |

* cited by examiner

METHOD AND DEVICE FOR GENERATING RANKING MODEL

CROSS-REFERENCE TO RELATED APPLICATION

The disclosure is the national phase application of International Patent Application No. PCT/CN2018/104683, titled "METHOD AND DEVICE FOR GENERATING RANKING MODEL", filed on Sep. 7, 2018, the entire contents of which are incorporated herein by reference.

TECHNICAL FIELD

The embodiment of the invention relates to computer technology, in particular to a method and a device for generating a ranking model.

BACKGROUND

Learning To Rank (L2R or LTR) is a ranking method based on supervised learning. The task is to rank a group of documents, and it is hoped that the algorithm can be designed by using artificially labeled data, and the rules hidden in the data can be mined, so that the document ranking reflecting the relevance provided for any query requirement can be completed.

For search ranking, a click data is usually used to train a ranking model and search results are ranked by the ranking model.

SUMMARY

The embodiment of the application provides a method and a device for generating a ranking model.

On a first aspect, one or more embodiments of the application provides a method for generating a ranking model, comprising: acquiring a sample set, wherein samples in the sample set comprises a query information and a clicked first position document and an unclicked second position document in a query result; executing following training steps: for the sample in the sample set, inputting the query information, the first position document and the second position document in the sample into an initial model, respectively obtaining scores of the input documents, and determining a target value of the sample based on the obtained scores, a clicked bias of a first position and an unclicked bias of a second position, wherein the clicked bias and the unclicked bias are respectively used for representing an influence degree of a position of a document in the query result on a clicked probability and an unclicked probability of the document; updating the initial model based on the target value of each sample; determining whether the initial model is completely trained; and in response to determining that the initial model is completely trained, determining the updated initial model as the ranking model.

In some embodiments of the application, wherein after the updating the initial model based on the target value of each sample, the training steps further comprises: re-estimating the clicked bias and the unclicked bias of each position based on the updated initial model and the sample set so as to update the clicked bias and the unclicked bias of each position.

In some embodiments of the application, wherein the method further comprises: in response to determining that the initial model is not completely trained, continuously executing the training step by using the updated initial model and the updated clicked bias and the updated unclicked bias of each position.

In some embodiments of the application, wherein the determining a target value of the sample based on the obtained scores, a clicked bias of a first position and an unclicked bias of a second position comprises: inputting the obtained scores, the clicked bias of the first position and the unclicked bias of the second position into a pre-established gradient calculation formula, and determining a gradient calculation result as the target value of the sample.

In some embodiments of the application, wherein the initial model is a decision tree; and the updating the initial model based on the target value of each sample comprises: establishing the decision tree, and fitting the target value of each sample; and updating the initial model based on the established decision tree.

In some embodiments of the application, wherein the determining whether the initial model is completely trained comprises: determining a number of the established decision trees, and comparing the number with a preset number; and determining whether the initial model is completely trained according to a comparison result.

In some embodiments of the application, wherein the determining a target value of the sample based on obtained scores, a clicked bias of a first position and an unclicked bias of a second position comprises: inputting the obtained scores, the clicked bias of the first position and the unclicked bias of the second position into a pre-established loss function to obtain a loss value, and determining the loss value as the target value of the sample.

In some embodiments of the application, wherein the determining whether the initial model is completely trained comprises: determining an average value of the target value of each sample, and comparing the average value with a preset value; and determining whether the initial model is completely trained according to a comparison result.

On a second aspect, one or more embodiments of the application further provides a device for generating a ranking model, comprising: an acquisition unit configured to acquire a sample set, wherein samples in the sample set comprises a query information and a clicked first position document and an unclicked second position document in a query result; a first training unit configured to execute following training steps: for the sample in the sample set, input the query information, the first position document and the second position document in the sample into an initial model, respectively obtain scores of the input documents, and determine a target value of the sample based on the obtained scores, a clicked bias of a first position and an unclicked bias of a second position, wherein the clicked bias and the unclicked bias are respectively used for representing an influence degree of a position of a document in the query result on a clicked probability and an unclicked probability of the document; update the initial model based on the target value of each sample; determine whether the initial model is completely trained; and in response to determining that the initial model is completely trained, determine the updated initial model as the ranking model.

In some embodiments of the application, wherein the first training unit is further configured to: after updating the initial model based on the target value of each sample, re-estimate the clicked bias and the unclicked bias of each position based on the updated initial model and the sample set so as to update the clicked bias and the unclicked bias of each position.

In some embodiments of the application, wherein the device further comprises: a second training unit configured to, in response to determining that the initial model is not completely trained, continuously execute the training step by using the updated initial model and the updated clicked bias and the updated unclicked bias of each position.

In some embodiments of the application, wherein the first training unit is further configured to: input the obtained scores, the clicked bias of the first position and the unclicked bias of the second position into a pre-established gradient calculation formula, and determine a gradient calculation result as the target value of the sample.

In some embodiments of the application, wherein the initial model is a decision tree; and the first training unit is further configured to: establish the decision tree, and fit the target value of each sample; and update the initial model based on the established decision tree.

In some embodiments of the application, wherein the first training unit is further configured to: determine a number of the established decision tree, and compare the number with a preset number; and determine whether the initial model is completely trained according to a comparison result.

In some embodiments of the application, wherein the first training unit is further configured to: input the obtained scores, the clicked bias of the first position and the unclicked bias of the second position into a pre-established loss function to obtain a loss value, and determine the loss value as the target value of the sample.

In some embodiments of the application, wherein the first training unit is further configured to: determine an average value of the target value of each sample, and compare the average value with a preset value; and determine whether the initial model is completely trained according to a comparison result.

On a third aspect, one or more embodiments of the application provides a method for generating information, comprising: in response to receiving a query request containing a target query information, retrieving candidate documents matched with the target query information and summarizing the candidate documents into a candidate document set; inputting the candidate documents in the candidate document set into a ranking model generated by the method according to any one of embodiments above-mentioned in the first aspect to obtain scores of the candidate documents; and ranking the candidate documents in the candidate document set according to an order from a large score to a small score, and returning a ranking result.

On a fourth aspect, one or more embodiments of the application provides a device for generating information, comprising: a retrieval unit configured to, in response to receiving a query request containing a target query information, retrieve candidate documents matched with the target query information and summarize the candidate documents into a candidate document set; an input unit configured to input the candidate documents in the candidate document set into a ranking model generated by the method according to any one of claims 1-8 to obtain scores of the candidate documents; and a ranking unit configured to rank the candidate documents in the candidate document set according to an order from a large score to a small score, and return a ranking result.

On a fifth aspect, one or more embodiments of the application provides an electronic apparatus, including: one or more processors; and a storage device, with one or more programs stored therein, when the one or more programs are executed by the one or more processors: acquire a sample set, wherein samples in the sample set comprise a query information and a clicked first position document and an unclicked second position document in a query result; execute following training steps: for the sample in the sample set, input the query information, the first position document and the second position document in the sample into an initial model, respectively obtain scores of the input documents, and determine a target value of the sample based on the obtained scores, a clicked bias of a first position and an unclicked bias of a second position, wherein the clicked bias and the unclicked bias are respectively used for representing an influence degree of a position of a document in the query result on a clicked probability and an unclicked probability of the document; update the initial model based on the target value of each sample; determine whether the initial model is completely trained; and in response to determining that the initial model is completely trained, determine the updated initial model as a ranking model.

On a sixth aspect, one or more embodiments of the application provides a computer-readable medium with a computer program stored therein, when the program is executed by a processor, the processor is caused to: acquire a sample set, wherein samples in the sample set comprise a query information and a clicked first position document and an unclicked second position document in a query result; execute following training steps: for the sample in the sample set, input the query information, the first position document and the second position document in the sample into an initial model, respectively obtain scores of the input documents, and determine a target value of the sample based on the obtained scores, a clicked bias of a first position and an unclicked bias of a second position, wherein the clicked bias and the unclicked bias are respectively used for representing an influence degree of a position of a document in the query result on a clicked probability and an unclicked probability of the document; updating the initial model based on the target value of each sample; determine whether the initial model is completely trained; and in response to determining that the initial model is completely trained, determine the updated initial model as a ranking model.

BRIEF DESCRIPTION OF THE DRAWINGS

Other features, objects, and advantages of the present application will become distinct from the following detailed description of non-limiting embodiments, which proceeds with reference to the accompanying drawings in which.

DETAILED DESCRIPTION OF THE INVENTION

The present application will be described in further detail below with reference to the accompanying drawings and embodiments. It is to be understood that the specific embodiments described herein are merely illustrative of the relevant application and are not limiting of the application. It is also to be noted that for ease of description, only those portions that are pertinent to the relevant application are shown in the accompanying drawings.

It should be noted that the embodiments and features in the embodiments of the present application may be combined with one another without conflict. The present application will now be described in detail in conjunction with the embodiments with reference to the accompanying drawings.

Figure 1:
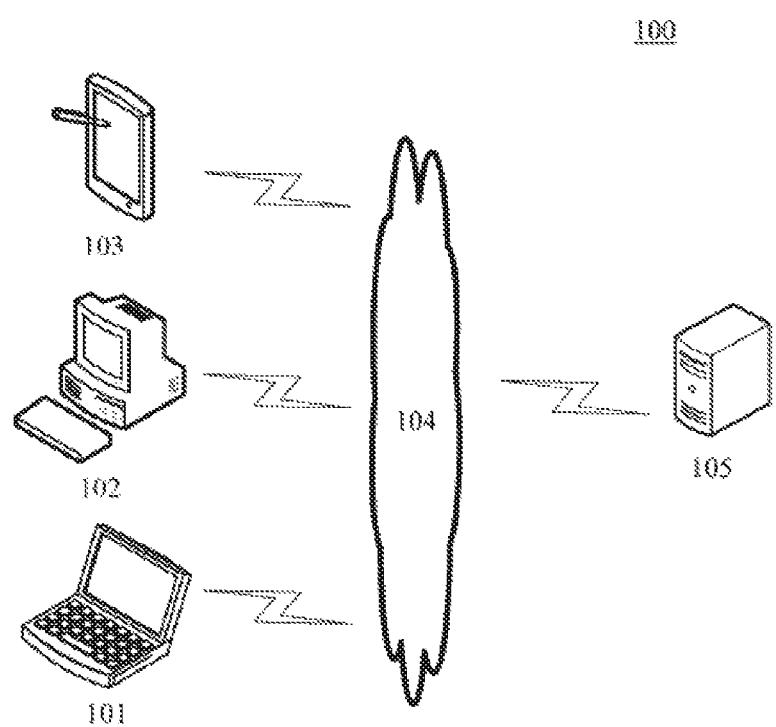
FIG. 1 is an exemplary system architecture diagram in which one or more embodiments of the present application may be applied.

FIG. 1 shows an exemplary system architecture 100 to which the method for generating ranking model or the apparatus for generating ranking model of the embodiments of the present application can be applied.

As shown in FIG. 1, system architecture 100 may comprise terminal equipment 101, 102 and 103, a network 104 and a server 105. The network 104 is used for providing a medium of a communication link between the terminal equipment 101, 102 and 103 and the server 105. The network 104 may comprise various connection types, such as wired and wireless communication links or an optical fiber.

A user can use the terminal equipment 101, 102 and 103 to interact with the server 105 via the network 104 to receive or send messages. Various communication client applications, such as Information browsing applications, search applications, instant messaging tools, email client and social platform applications, can be installed in the terminal equipment 101, 102 and 103.

The terminal equipment 101, 102 and 103 may be hardware or software. When being hardware, the terminal equipment 101, 102 and 103 may be various kinds of electronic equipment with display screens, including but not limited to smart phones, tablet computers, laptop portable computers and desktop computers, etc. When being software, the terminal equipment 101, 102 and 103 can be installed in the electronic equipment listed above. The terminal equipment may be implemented as multiple pieces of software or software modules (such as multiple pieces of software or software modules used for providing distributed service), may also be implemented as a single piece of software or software module, which is not limited herein.

The server 105 may be a server that provides various services, such as, may be a processing server that provides support for search engines. The processing server may store the sample set or obtain the sample set from other devices. A sample set can contain multiple samples. Wherein, the sample may include a query information, a clicked first location document and an unclicked second location document in a query result. In addition, the processing server can use the samples in the sample set to train the initial model, and can store the training results (such as the generated ranking model). In this way, after the user sends a query request using the terminal devices 101, 102, and 103, the server 105 may determine to rank the query results, and then return the sorted query results to the terminal devices 101, 102, and 103.

It should be noted that the server 105 may be hardware or software. When being hardware, the server 105 may be implemented as a distributed server cluster including a plurality of servers, and may also be implemented as the single server. When being software, the server 105 may be implemented as multiple pieces of software or software modules (such as used for providing distributed service), and may also be implemented as a single piece of software or software module, which is not limited herein.

it should be noted that the method for generating ranking model provided by the embodiments of the application is generally executed by the server 105, and accordingly, the apparatus for generating ranking model is generally provided in the server 105.

It should be understood that numbers of the terminal equipment, the network and the server in FIG. 1 are exemplary only. Any number of terminal equipment, networks and servers may be provided according to implementation requirements.

Figure 2:
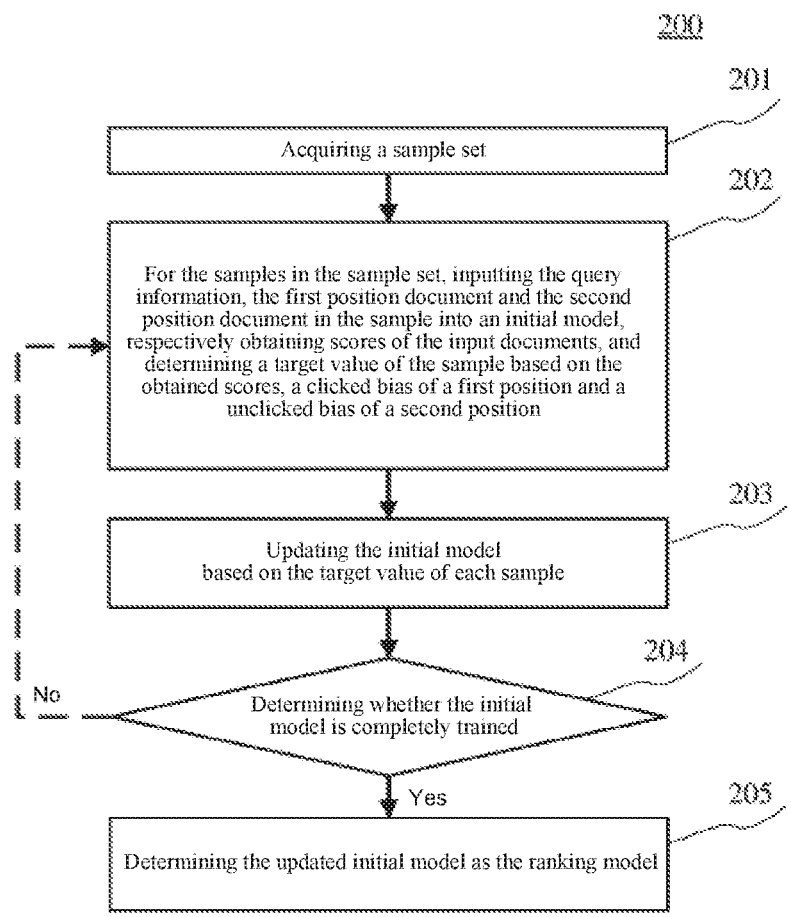
FIG. 2 is a flow diagram of one or more embodiments of a method for generating a ranking model according to the present application.

With continuing reference to FIG. 2, a flow 200 of one or more embodiments of a method for generating a ranking model according to the present application is shown. The method for generating a ranking model comprises the following steps:

Step 201, a sample set is acquired.

In this embodiment, an executive subject of the method for generating a ranking model (e.g., server 105 shown in FIG. 1) may acquire the sample set in a variety of ways. For example, the executive subject may obtain an existing sample set stored in another server (e.g., a database server) for storing samples through a wired connection or a wireless connection. As another example, a user may collect samples through a terminal device (e.g., terminal devices 101, 102 and 103 shown in FIG. 1) and store the samples locally to generate the sample set. It should be noted that the above wireless connection may include, but are not limited to, 3G/4G connection, WiFi connection, Bluetooth connection, WiMAX connection, Zigbee connections, UWB (ultra wideband) connection, and other wireless connection now known or developed in the future.

Here, the samples in the sample set may be previously obtained from the user's historical behavior information (which may include, for example, clicked data, query requests, etc.). A large number of samples may be included in the sample set. The samples in the sample set can comprise a query information and a clicked first position document and an unclicked second position document in a query result. Here, the query information may be a characteristic representation of a query string in the query request sent by the user (e.g., may be represented using an eigenvector). The first position document may be any clicked document in the query result. The position of the document in the query result may be referred to as a first position. The second position document may be any unclicked document in the query result. The position of the document in the query result may be referred to as a second position. It should be noted that the documents herein may be represented in the form of eigenvectors or the like of the documents.

As an example, if a user enters a string "machine learning" in a search engine, the string "machine learning" is the query string. In the query result returned by the search engine, the user clicks the document ranked in the fifth position of the query result, but does not click the document ranked in the sixth position of the query result. Then, the document ranked in the fifth position clicked by the user may be referred to as the first position document, and the fifth position is taken as the first position. Meanwhile, the document which is not clicked by the user and is ranked in the sixth position may be referred to as the second position document, and the sixth position is taken as the second position.

It will be appreciated that after the user sends a query request, the user typically clicks only a small number of documents in the query result for the returned query result. Thus, multiple samples may be constructed for a particular query request. As an example, the returned query result contains 10 documents. If the user clicks two of them, then 16 samples can be formed.

It will be appreciated that to distinguish whether the document in the sample is clicked, the document in the sample may be labeled in advance. For each sample, the first position document in the sample may correspond to a label indicating that the document is clicked, and the second position document in the sample may correspond to a label indicating that the document is not clicked.

In this embodiment, after acquiring the sample set, the executive subject may execute the training steps of Steps 202 through 204.

Step 202, the query information, the first position document and the second position document in the sample are input into an initial model for the sample in the sample set, scores of the input documents are respectively obtained, and the target value of the sample are determined based on the obtained scores, the clicked bias of the first position and the unclicked bias of the second position.

In the embodiment, for the sample in the sample set, the executive subject can execute the following steps:

Firstly, inputting the query information, the first position document and the second position document in the sample into the initial model, and respectively obtaining scores of the input documents. The initial model can output a score of the first position document and a score of the second position document by performing feature extraction, analysis and the like on the query information, the first position document and the second position document. The output score may be used to represent a degree of relevance of the document to the query information calculated by the initial model. The higher the score of the document, the more relevant the document is to the query information.

Here, the initial model may be a variety of existing model structures (e.g., model structures such as Ranknet, lambdaRank, SVM Rank, lambdaMart, decision tree, etc.) that are established based on machine learning techniques and are suitable for the PairWise Approach. The initial model can perform feature extraction on the document and the query information, then analyze or otherwise process on the extracted features, and finally output the score of the document. In practice, PairWise Approach is a method in ranking learning algorithms.

Secondly, determining the target value of the sample based on the obtained scores, the clicked bias of the first position and the unclicked bias of the second position.

Here, the obtained scores, the clicked bias of the first position, and the unclicked bias of the second position may be input into a pre-established target value calculation formula to obtain the target value of the sample. Here, the target value calculation formula may be a pre-established function or formula related to the document score, the clicked bias, and the unclicked bias. For example, it may be a pre-established gradient calculation formula, a pre-established loss function, a pre-established partial derivation of a loss function, etc. The value output by the target value calculation formula is the target value. It should be noted that the target value calculation formula may also be other forms of pre-established functions or formulas, and is not limited to the above examples.

Here, the clicked bias may be used to represent an influence degree of the position of the document in the query result on a clicked probability of the document. The unclicked bias can be used to represent an influence degree of the position of the document in the query result on an unclicked probability of the document. Here, the clicked bias and the unclicked bias of each position can be expressed by numerical values. In addition, the initial values of the clicked bias and the unclicked bias of the respective positions may be set in advance (e.g., the initial values are both set to 1).

It will be appreciated that, in theory, the higher the relevance of the document to the query information, the greater the clicked probability of the document, and the less the unclicked probability. However, because of the different position of the document in the query result, the clicked probability and the unclicked probability of the document would be influenced. For example, when two documents have the same relevance to the query information, the user typically browses the document in the earlier ranked position first. It is generally considered that the document ranked earlier has greater relevance to the retrieved information. This renders the fact that the documents ranked higher are more likely to be clicked by the user, and are less likely not to be clicked by the user. Therefore, in the ranking learning process, the model trained only by using the clicked data cannot accurately reflect the relevance of the document to the query information, and the influence of the position of the document in the ranking result on the clicked probability and the unclicked probability of the document needs to be considered. In practice, a clicked bias may also be referred to as a position bias.

In some optional implementations of this embodiment, the executive subject may input the obtained scores, the clicked bias of the first position, and the unclicked bias of the second position into a pre-established loss function to obtain a loss value and determine the loss value (i.e. a value of the target function) as the target value of the sample. In practice, the loss function can be used to measure an inconsistency between a predicted value of the initial model and a true value. It is a nonnegative real-valued function. In general, the smaller the loss value, the better the robustness of the model. The loss function here may be pre-established based on an existing loss function (e.g. a cross entropy loss function) in combination with the clicked bias and the unclicked bias. As an example, the loss function here can be established by taking a product of the clicked bias and the unclicked bias as a denominator and taking the cross entropy loss function as a numerator. At this time, for a certain sample, the denominator of the loss function used is a product of the clicked bias of the first position where the first position document in the sample is located and the unclicked bias of the second position where the second position document in the sample is located.

In some optional implementations of this embodiment, the executive subject may input the obtained scores, the clicked bias of the first position, and the unclicked bias of the second position into a pre-established gradient calculation formula, and determine the gradient calculation result as the target value of the sample. The gradient calculation formula herein may be pre-established based on an existing gradient calculation formula (e.g., gradient calculation formulas used in the lambdaRank model and the lambdaMART model) combined with the clicked bias and the unclicked bias. As an example, the gradient calculation formula herein may be established by taking a product of the clicked bias and the unclicked bias as a denominator, and taking the existing gradient calculation formula used by models such as lambdaRank and lambdaMART, etc. as a numerator. At this time, for a certain sample, the denominator of the gradient calculation formula used is the product of the clicked bias of the first position where the first position document in the sample is located and the unclicked bias of the second position where the second position document in the sample is located.

Step 203, the initial model is updated based on the target value of each sample.

In this embodiment, the executive subject may update the initial model based on the target value of each sample. Here, the updating of the initial model may be performed in different ways for different initial models and different target values (e.g., loss values or gradients, etc.).

In some optional implementations of this embodiment, when the target value of the sample is a loss value, the executive subject may first determine an average value of the loss value of each sample. Then, a gradient of the average value of the loss value relative to an initial model parameter can be obtained by using a back propagation algorithm, and then the initial model parameter is updated based on the gradient by using a gradient descent algorithm. It should be noted that the back propagation algorithm, the gradient descent algorithm, and the machine learning method are well-known techniques that are widely studied and applied at present and will not be described in detail herein. In practice, the initial model can adopt Ranknet, SVM Rank and other model structures.

In some optional implementations of this embodiment, when the target value of the sample is the gradient, the executive subject may directly update the initial model parameter based on the gradient using the gradient descent algorithm. In practice, the initial model may adopt a model structure such as lambdaRank.

In some optional implementations of this embodiment, the initial model may be a decision tree and the target value of each sample may be the gradient. After obtaining the target value of each sample, the executive subject can first establish a new decision tree to fit the target value of each sample. The initial model may then be updated based on the established decision tree. Here, the updating of the initial model can be performed by using the MART (Multiple Additive Regression Tree) algorithm. Here, the MART may also be referred to as GBDT (Gradient Boosting Decision Tree), GBRT (Gradient Boosting Regression Tree), TreeNet (Decision Tree Network), etc. It should be noted that the MART algorithm is a well-known technique that is widely studied and applied at present and will not be described in detail herein.

Step 204, whether the initial model is completely trained is determined.

In this embodiment, the executive subject may determine whether the initial model is completely trained in various ways. As an example, a number of executions of the training step can be determined. In response to determining that the number of executions reached the preset number, it may be determined that the training is completed. In response to determining that the number of executions has not reached the preset number, it may be determined that the training is not completed.

In some optional implementations of this embodiment, the initial model may be a decision tree. The executive subject may record a number of established decision trees. Each time a decision tree is established, the executive subject may update the number recorded. After updating the initial model at Step 203, the executive subject may determine the number of established decision trees. Whether the initial model is completely trained is determined based on a comparison result of the number with the preset number. For example, it may be determined that the initial model is completely trained in response to determining that the number of established decision trees is not less than the preset number. In response to determining that the number of established decision trees is less than the preset number, it may be determined that the initial model is not completely trained.

In some optional implementations of this embodiment, when the target value is a loss value, the executive subject may first determine the average value of the target value of each sample. Then the average value can be compared with a preset value, and it can be determined whether the initial model is completely trained based on a comparison result. For example, it can be determined that the initial model is completely trained in response to determining that a target loss value is less than or equal to the preset value. In response to determining that the target loss value is greater than the preset value, it can be determined that the initial model is not completely trained. It should be noted that the preset value may generally be used to represent an ideal case of a degree of inconsistency between a predicted value and a true value. That is, when the target loss value is less than or equal to the preset value, the predicted value may be considered to be close to or approximate to the true value. In practice, the preset value may be set according to actual requirements.

In some optional implementations of this embodiment, when the target value is a loss value, the executive subject may compare the loss value of each sample with the preset value respectively. The executive subject may obtain a ratio of the samples of which the loss values are less than or equal to the preset value to the samples in the sample set. When the ratio reaches a preset sample ratio (such as 95%), it can be determined that the initial model is completely trained.

It should be noted that the executive subject may also determine whether the initial model is completely trained in other ways, and is not limited to the various implementations described above.

Step 205, an updated initial model is determined as the ranking model, in response to determining that the initial model is completely trained.

In this embodiment, in response to determining that the initial model is completely trained, the executive subject may determine the initial model updated in Step 203 as the ranking model.

In some optional implementations of this embodiment, after updating the initial model in Step 203, the executive subject may also re-estimate the clicked bias and the unclicked bias of each position based on the updated initial model and the sample set to update the clicked bias and the unclicked bias of each position. The specific implementation is as follows:

When the target of each sample determined in Step 202 is a gradient, the executive subject may first input the query information, the first position document, and the second position document in each sample in the sample set into the updated initial model, thereby giving the score of each document in each sample. Then, fix the current unclicked bias of each position, input the obtained scores into the gradient calculation formula, and make the gradient calculation formula used equal to zero, thereby estimate the clicked bias of each position. Then, fix the estimated clicked bias of each position, input the obtained scores into the gradient calculation formula, and make the gradient calculation formula used equal to zero, thereby estimate the unclicked bias of each position. Thus, the clicked bias and the unclicked bias of each position are updated.

When the target of each sample determined in Step 202 is a loss value, the executive subject may first input the query information, the first position document, and the second position document in each sample in the sample set into the updated initial model, thereby giving the score of each document in each sample. Then, calculate a partial derivative of the loss function to obtain the gradient calculation formula of the loss function. Then, fix the current unclicked bias of each position, input the obtained scores into the obtained gradient calculation formula, and make the gradient calculation formula used equal to zero, thereby estimate the clicked bias of each position. Here, the clicked bias of each position is estimated, which may be sequentially estimated in the order of positions. Namely, firstly the clicked bias of a first position is estimated; then the clicked bias of a second position is estimated; and so on. When the clicked bias of each position is estimated, a sample containing the clicked document at that position of the query result may be used. After the clicked bias of each position is estimated, the estimated clicked bias of each position can be fixed, the obtained score is input into the obtained gradient calculation formula, and the gradient calculation formula used is made equal to zero, so that the unclicked bias of each position is estimated. Here, the unclicked bias of each position is estimated, which may be sequentially estimated in the order of the positions. Namely, firstly the unclicked bias of the first position is estimated; then the unclicked bias of the second position is estimated; and so on. When the unclicked bias of each position is estimated, a sample containing the unclicked document at that position of the query result may be used. Therefore, the clicked bias and the unclicked bias of each position can be updated.

In some optional implementations of this embodiment, in response to determining that the initial model is not completely trained, the executive subject may continuously execute the training step using the updated initial model and the updated clicked bias and the updated unclicked bias of each position.

Figure 3:
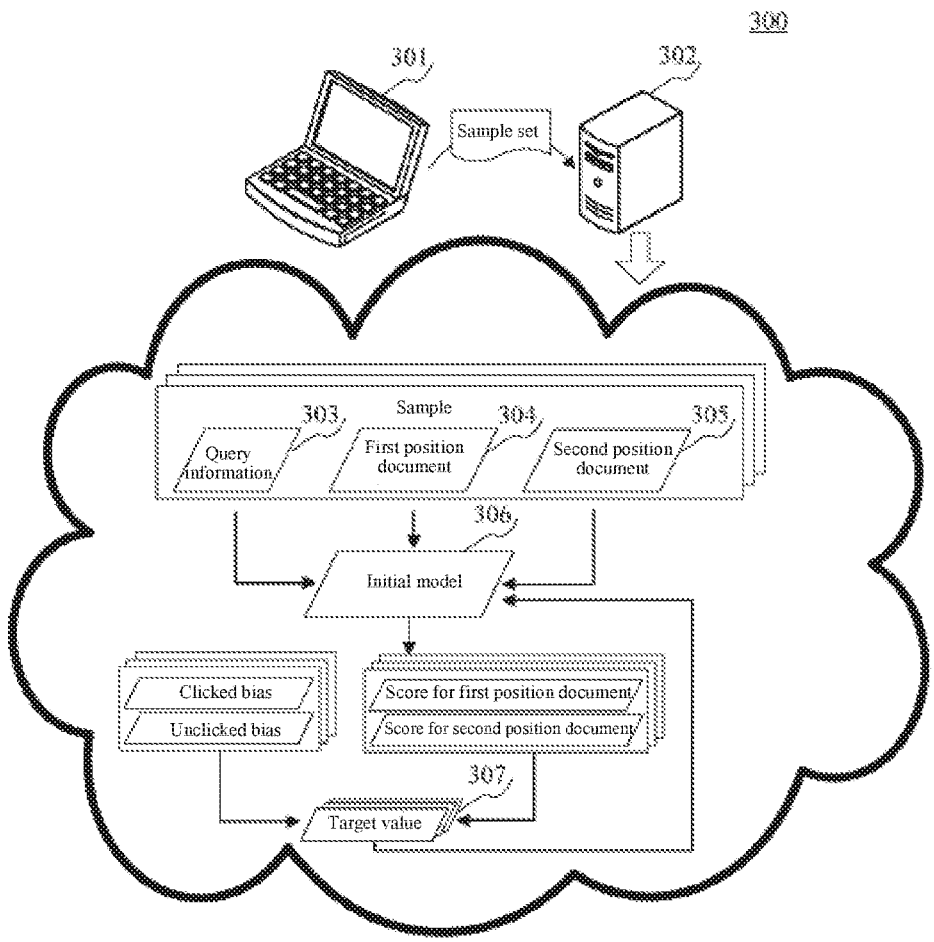
FIG. 3 is a schematic diagram of an application scenario of a method for generating a ranking model according to the present application.

With continuing reference to FIG. 3, FIG. 3 is a schematic diagram of an application scenario of a method for generating a ranking model according to the present embodiment. In the application scenario of FIG. 3, a model training type application may be installed on the terminal device 301 used by the user (e.g., a technician). After the user opens the application and uploads the sample set or a storage path for the sample set, the server 302 providing background support for the application may run a method for generating a ranking model, including that:

First, a sample set may be obtained. Among other things, the samples in the sample set may include a query information 303, a clicked first position document 304 and an unclicked second position document 305 in a query result. Thereafter, the following training steps may be executed based on the sample set: for a sample in the training set, imputing the query information, the first position document, and the second position document in the sample into the initial model 306, obtaining scores for the input first position document and the second position document; then, determining a target value 307 of the sample based on the obtained scores, the clicked bias of the first position and the unclicked bias of the second position; then updating the initial model based on the target value of each sample; finally, determining whether the initial model is completely trained, if the initial model is completely trained, determining the trained initial model as the ranking model.

According to the method provided by the embodiments of the invention, the samples in the sample set can be used for training the initial model by acquiring the sample set. The samples in the sample set can comprise the query information, the clicked first position document and the unclicked second position document in the query result. Thus, the query information, the first position document and the second position document in the sample are input into the initial model, and the scores of the first position document and the second position document can be obtained. Based on the obtained scores, the clicked bias of the first position and the unclicked bias of the second position, the target value of the sample can be determined. The initial model may then be updated based on the target value of each sample. Finally, whether the initial model is completely trained can be determined, and if the initial model is completely trained, the trained initial model can be determined as the ranking model. Therefore, a model for ranking can be obtained, and the generation approach of the model can be enriched.

In addition, in the previous ranking learning, usually only the clicked bias is considered, and the unclicked bias is not considered, so that the ranking learning cannot be directly applied to the PairWise Approach. The ranking model trained by the method provided by the embodiments of the application not only considers the clicked bias, but also considers the unclicked bias. Therefore, the ranking model is suitable for ranking learning of the PairWise Approach. Since the PairWise Approach has a better ranking effect compared with the PointWise Approach, the ranking accuracy can be improved by using the ranking model trained by the method provided by the embodiments of the invention.

Figure 4:
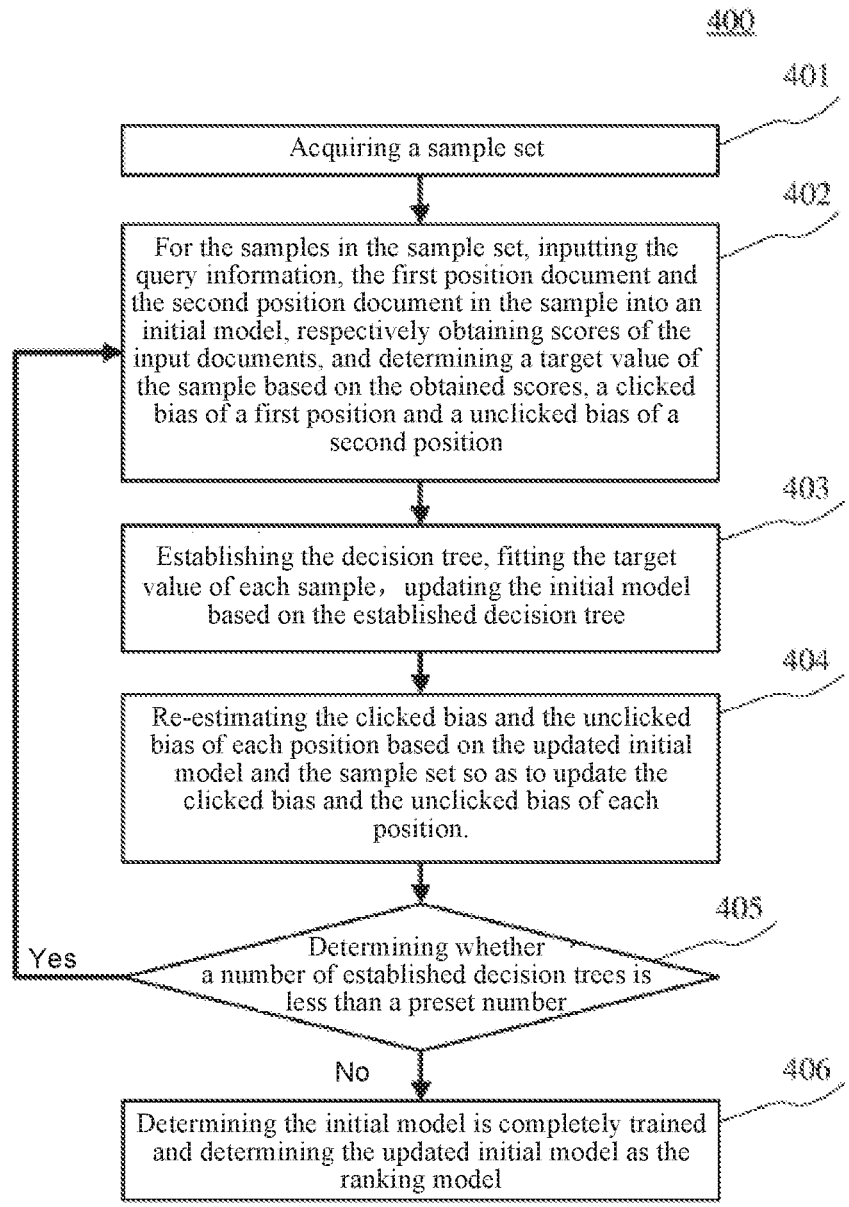
FIG. 4 is a flow diagram of another embodiment of a method for generating a ranking model according to the present application.

With a further reference to FIG. 4, a flow 400 of another embodiment of a method for generating a ranking model is shown. The flow 400 of the method for generating a ranking model includes the following steps:

Step 401, a sample set is acquired.

In this embodiment, the executive subject of the method for generating a ranking model (e.g., server 105 shown in FIG. 1) may acquire the sample set. A large number of samples may be included in the sample set. The samples in the sample set can comprise a query information and a clicked first position document and an unclicked second position document in a query result. The first position document may be any clicked document in the query result. The position of the document in the query result may be referred to as a first position. The second position document may be any unclicked document in the query result. The position of the document in the query result may be referred to as a second position.

After acquiring the sample set, the executive subject may execute the training steps of Steps 402 through 405.

Step 402, for the sample in the sample set, the query information, the first position document and the second position document in the sample are input into the initial model, scores of the input documents are respectively obtained, the obtained scores, the clicked bias of the first position and the unclicked bias of the second position are input into a pre-established gradient calculation formula, and a gradient calculation result are determined as a target value of the sample.

In the embodiment, for the samples in the sample set, the executive subject may execute the following steps:

firstly, inputting the query information, the first position document and the second position document in the sample into the initial model, and respectively obtaining scores of the input documents. Among other things, the initial model may use a decision tree.

secondly, inputting the obtained scores, the clicked bias of the first position and the unclicked bias of the second position into the pre-established gradient calculation formula, and determining the gradient calculation result as the target value of the sample. The gradient calculation formula here can be a calculation formula established by taking an existing gradient calculation formula (such as the gradient calculation formula used by the lambdaMART model) as a numerator and taking the product of the clicked bias and the unclicked bias as a denominator. For a sample, the denominator of the gradient calculation formula used is a product of the clicked bias of the first position where the first position document in the sample is located and the unclicked bias of the second position where the second position document in the sample is located.

Step 403, a decision tree is established, the target value of each sample is fitted, and the initial model is updated based on the established decision tree.

In this embodiment, the executive subject may first establish a new decision tree to fit the target value of each sample. The initial model may then be updated using the MART algorithm based on the established decision tree.

Step 404, the clicked bias and the unclicked bias of each position are re-estimated based on the updated initial model and the sample set so as to update the clicked bias and the unclicked bias of each position.

In this embodiment, after updating the initial model, the executive subject may re-estimate the clicked bias and the unclicked bias of each position based on the updated initial model and the sample set to update the clicked bias and the unclicked bias of each position. Specifically, the executive subject may first input the query information, the first position document, and the second position document in each sample in the sample set into the updated initial model, thereby giving the score for each document in each sample. Then, fix the current unclicked bias of each position, input the obtained score into the gradient calculation formula, and make the gradient calculation formula used equal to zero, so that to estimate the clicked bias of each position. Then, fix the estimated clicked bias of each position, input the obtained score into the gradient calculation formula, and make the gradient calculation formula used equal to zero, thereby estimate the unclicked bias of each position. Thus, the update of the clicked bias and the unclicked bias of each position is realized.

Step 405, whether a number of established decision trees is less than a preset number is determined.

In this embodiment, the executive subject may record the number of established decision trees. Each time a decision tree is established, the executive subject may update the number recorded. Here, the executive subject may determine whether the number of established decision trees is less than the preset number. If not, it is determined that the initial model is completely trained; conversely, it is determined that the initial model is not completely trained.

Step 406, it is determined that the initial model is completely trained in response to determining that the number of the established decision trees is not less than the preset number, and the updated initial model is determined as the ranking model.

In this embodiment, it may be determined that the initial model is completely trained in response to determining that the number of established decision trees is not less than the preset number. At this time, the model updated in Step 403 may be determined as the ranking model.

In this embodiment, in response to determining that the initial model is not completely trained, the executive subject may continuously execute the training step using the updated initial model and the updated clicked bias and the updated unclicked bias of each position.

As can be seen from FIG. 4, in contrast to the embodiment corresponding to FIG. 2, the flow 400 of the method for generating a ranking model in this embodiment involves the steps of updating the clicked bias and the unclicked bias, and, when the training is not completed, continuing the training using the updated clicked bias and the updated unclicked bias and the updated initial model to obtain the ranking model. Therefore, the solution described by the embodiment can learn the ranking model from the clicked data off line, and estimate the clicked bias and the unclicked bias of the position in the model learning process. Compared with the previous ranking learning mode (i.e. firstly estimating the clicked bias, and then taking the estimated clicked bias as a fixed value, and learning the ranking model by using the PointWise Approach), the method for generating a ranking model in the embodiment can simultaneously correct the clicked data and train the model based on improving the ranking accuracy, thereby improving the training efficiency.

Figure 5:
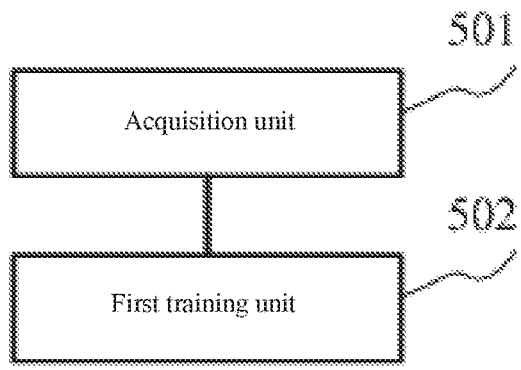
FIG. 5 is a structural schematic diagram of one or more embodiments of a device for generating a ranking model according to the present application.

With further reference to FIG. 5, as an implementation of the method shown in the figures, the present application provides one or more embodiments of a device for generating a ranking model, the embodiment of the device corresponding to the embodiment of the method shown in FIG. 2, which device is particularly applicable to a variety of electronic apparatuses.

As shown in FIG. 5, the device 500 for generating a ranking model according to the present embodiment includes: an acquisition unit 501 configured to acquire a sample set, wherein samples in the sample set comprises a query information, a clicked first position document and an unclicked second position document in a query result; a first training unit 502 configured to execute following training steps: for the sample in the sample set, input the query information, the first position document and the second position document in the sample into an initial model, respectively obtain scores of the input documents, determine a target value of the sample based on obtained scores, the clicked bias of the first position and the unclicked bias of the second position, wherein the clicked bias and the unclicked bias are respectively used for representing an influence degree of the position of the document in the query result on a clicked probability and an unclicked probability of the document; update the initial model based on the target value of each sample; and, in response to determining that the initial model is completely trained, determine an updated initial model as the ranking model.

In some optional implementations of this embodiment, the first training unit 502 may be further configured to re-estimate the clicked bias and the unclicked bias of each position based on the updated initial model and the sample set after updating the initial model based on the target value of each sample to update the clicked bias and the unclicked bias of each position.

In some optional implementations of this embodiment, the device may further include a second training unit (not shown). The second training unit may be configured to continuously execute the training step using the updated initial model and the updated clicked bias and unclicked bias of each position in response to determining that the initial model is not completely trained.

In some optional implementations of this embodiment, the first training unit 502 may be further configured to: input the obtained scores, the clicked bias of the first position and the unclicked bias of the second position into a pre-established gradient calculation formula, and determine a gradient calculation result as the target value of the sample.

In some optional implementations of this embodiment, the initial model may be a decision tree. The first training unit 502 can be further configured to: establish the decision tree, and fit the target value of each sample; and update the initial model based on the established decision tree.

In some optional implementations of this embodiment, the first training unit 502 may be further configured to: determine a number of established decision tree, and compare the number with a preset number; and determine whether the initial model is completely trained according to a comparison result.

In some optional implementations of this embodiment, the first training unit 502 may be further configured to: input the obtained scores, the clicked bias of the first position and the unclicked bias of the second position into a pre-established loss function to obtain a loss value, and determine the loss value as the target value of the sample.

In some optional implementations of this embodiment, the first training unit 502 may be further configured to: determine an average value of the target value of each sample, and compare the average value with a preset value; and determine whether the initial model is completely trained according to a comparison result.

According to the device provided by the embodiment of the invention, the samples in the sample set can be used for training the initial model by acquiring the sample set. The samples in the sample set can comprise a query information and a clicked first position document and an unclicked second position document in a query result. Thus, the query information, the first position document and the second position document in the sample are input into the initial model, and scores of the first position document and the second position document can be obtained. The initial model may then be updated based on the target value of each sample. Finally, whether the initial model is completely trained can be determined, and if the initial model is completely trained, the trained initial model can be determined as the ranking model. Therefore, a model for ranking can be obtained, and the generation approach of the model can be enriched.

In addition, in the previous ranking learning, usually only the clicked bias is considered, and the unclicked bias is not considered, so that the ranking learning cannot be directly applied to the PairWise Approach. The ranking model trained by the method provided by the embodiments of the application not only considers the clicked bias, but also considers the unclicked bias. Therefore, the ranking model is suitable for ranking learning of the PairWise Approach. Since the PairWise Approach has a better ranking effect compared with the PointWise Approach, the ranking accuracy can be improved by using the ranking model trained by the method provided by the embodiments of the application.

Figure 6:
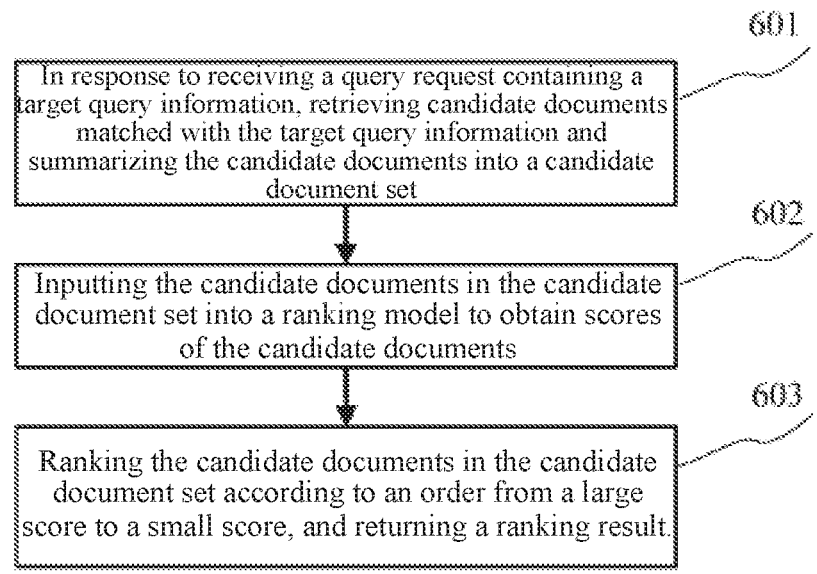
FIG. 6 is a flow diagram of one or more embodiments of a method for generating information according to the present application.

Referring to FIG. 6, a flow 600 of one embodiment of a method for generating information provided by the present application is shown. The method for generating information may comprise the following steps:

Step 601, in response to receiving a query request containing target query information, candidate documents matched with the target query information are retrieved and the candidate documents are summarized into a candidate document set.

In the present embodiment, an executive subject of a method for generating information, such as the server 105 shown in FIG. 1, may receive the query request containing the target query information through a wired connection or a wireless connection. Then, the candidate documents matched with the target query information can be retrieved and summarized into the candidate document set. Among other things, the query request may be sent by a terminal device (e.g., terminal devices 101, 102 and 103 shown in FIG. 1).

Step 602, the candidate documents in the candidate document set are input into the ranking model to obtain scores of the candidate documents.

In the embodiment, the executive subject can input the candidate documents in the candidate document set into the ranking model to obtain the scores of the candidate documents. Here, the ranking model may be generated using the method as described with respect to the embodiment of FIG. 2. The specific generation process can be understood with reference to the description of the embodiment of FIG. 2 and will not be described in detail here.

Step 603, the candidate documents in the candidate document set are ranked according to an order from a large score to a small score, and a ranking result is returned.

In this embodiment, the executive subject may rank the candidate documents in the candidate document set in the order of the scores obtained in Step 602 from large to small, and return the ranking result.

It should be noted that the method for generating information of the present embodiment can be used to test the ranking model generated by the embodiments. Furthermore, the ranking model can be continuously optimized according to the test results. The method can also be a practical application method of the ranking model generated by the embodiments. According to the ranking model generated by the embodiments, the documents are scored and then ranked, so that the ranking performance is improved.

Figure 7:
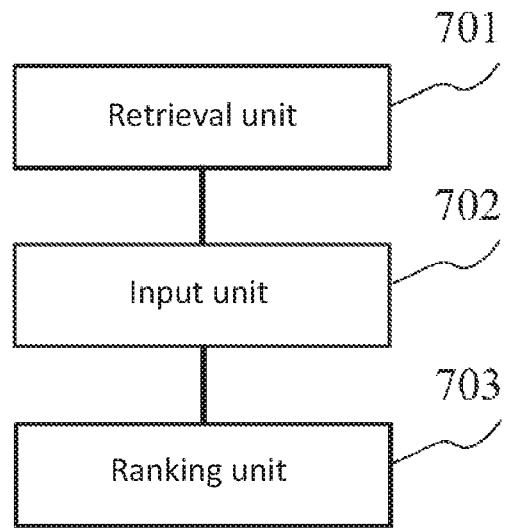
FIG. 7 is a structural schematic diagram of one or more embodiments of a device for generating information according to the present application.

With continuing reference to FIG. 7, as an implementation of the method illustrated in FIG. 6, the present application provides one embodiment of a device for generating information. This embodiment of the device corresponds to the embodiment of the method shown in FIG. 6, which device is particularly applicable to various electronic apparatuses.

As shown in FIG. 7, the device 700 for generating information according to the present embodiment includes: a retrieval unit 701, configured to retrieve candidate documents matched with a target query information and summarize the candidate documents into a candidate document set in response to receiving a query request containing the target query information; an input unit 702, configured to input the candidate documents in the candidate document set into the ranking model generated by the method as described in the embodiment of FIG. 2 to obtain scores for the candidate documents, and a ranking unit 703, configured to rank the candidate documents in the candidate document set according to an order from a large score to a small score and return a ranking result.

It will be appreciated that the units recited in the device 700 correspond to the various steps in the method described with reference to FIG. 6. Thus, the operations, features, and resulting advantages described with respect to the method are equally applicable to the device 700 and the units contained therein and will not be described in further detail herein.

Figure 8:
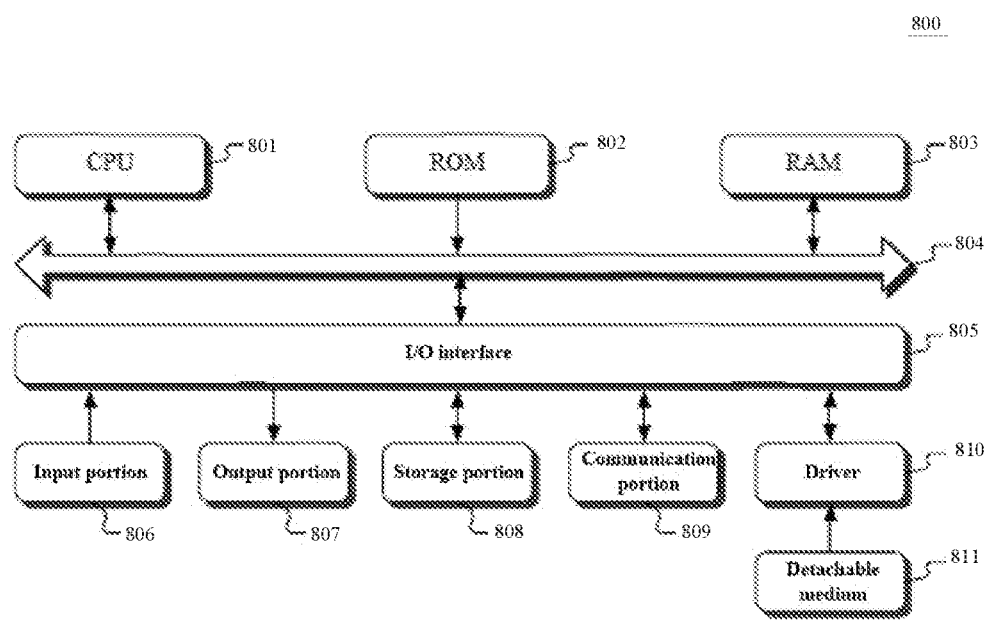
FIG. 8 is a structural schematic diagram of a computer system suitable for implementing an electronic apparatus of one or more embodiments of the present application.

Refer to FIG. 8 below, which shows a schematic structural diagram of a computer system 800 suitable for implementing the electronic apparatus of the embodiment of the present application. The server shown in FIG. 8 is only an example, and should not bring any limitation to the functions and usage scope of the embodiments of the present application.

As shown in FIG. 8, the computer system 800 comprises a central processing unit (CPU) 801 which can execute various appropriate actions and processes according to programs stored in a read-only memory (ROM) 802 or programs loaded to a random-access memory (RAM) 803 from a storage portion 808. Various programs and data required by operation of the system 800 are also stored in the RAM 803. The CPU 801, ROM 802 and RAM 803 are connected to one another through a bus 804. An input/output (I/O) interface 805 is also connected to the bus 804.

The I/O interface 805 is connected with following components: an input portion 806 including a keyboard, a mouse, etc; an output portion 807 including a cathode-ray tube (CRT), a liquid crystal display (LCD), a loudspeaker, etc; a storage portion 808 including a hard disk, etc; and a communication portion 809 including a network interface card such as an LAN card and a modem. The communication portion 809 executes communication through networks such as the Internet. A driver 810 is also connected to the I/O interface 805 as required. A detachable medium 811, such as a magnetic disk, an optical disk, a magneto-optical disk and a semiconductor memory, is installed on the driver 810 as required, so that computer programs read from the detachable medium can be installed into the storage portion 808 as required.

Specifically, processes described above with reference to flowcharts may be implemented as computer software programs in accordance with embodiments of the present disclosure. For example, one or more embodiments of the present application comprises a computer program product which comprises a computer program carried on a computer readable medium, and the computer program comprises program codes used for executing the method shown in the flowchart. In such embodiment, the computer program may be downloaded from the network through the communication portion 809 and installed, and/or downloaded from the detachable medium 811 and installed. When the computer program is executed by the central processing unit (CPU) 801, a function defined in the method provided by the present application is executed. It should be noted that the computer readable medium of the present application may be a computer readable signal medium or a computer readable storage medium, or any combination of the computer readable signal medium or the computer readable storage medium. The computer readable storage medium may be, for example, but is not limited to, an electronic, magnetic, optical, electromagnetic, infrared, or semiconductor system, apparatus, or device, or combination of any of the above. More specifically, the computer readable storage medium may include, but is not limited to, an electrical connector having one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above. In the present application, the computer readable storage medium may be any tangible medium that contains or stores a program that can be used by or in combination with an instruction execution system, apparatus, or device. In the present application, a computer readable signal medium may include a data signal propagating in a baseband or as a part of a carrier wave, wherein computer readable program codes are carried in the data signal. Such propagated data signal be in various forms, including but not limited to an electromagnetic signal, an optical signal, or any appropriate combination of the above. The computer readable signal medium may also be any computer readable medium other than the computer readable storage medium, and the computer readable medium can transmit, propagate, or transport the program used by or in combination with the instruction execution system, apparatus, or device. The program codes included in the computer readable medium may be transmitted via any appropriate medium, including but not limited to wireless, electrical wires, optical cables, RF, etc., or any appropriate combination of the above.

The flowcharts and block diagrams in the figures illustrate the possible system architecture, functions, and operation of systems, methods, and computer program products according to various embodiments of the present application. In view of this, each block in the flowcharts or block diagrams may represent a module, a program segment, or a portion of codes, and the module, the program segment or the portion of codes contains one or more executable instructions for implementing specified logical functions. It should also be noted that in some alternative implementations, the functions labeled in the blocks may be implemented according to an order different from the order labeled in the figures. For example, the two blocks shown in succession may, in fact, be executed substantially concurrently, or may sometimes be executed in a reverse order, depending upon the functions involved. It should also be noted that each block in the block diagrams and/or flowcharts, and combinations of blocks in the block diagrams and/or flowcharts can be implemented by dedicated hardware-based systems used for carrying out the specified functions or operation, or can be implemented by combinations of dedicated hardware and computer instructions.

Units described in the embodiments of the present application may be implemented in a software mode or in a hardware mode. The described units may also be arranged in a processor, for example, the units can be described as follows: a processor comprises an acquisition unit and a first training unit, wherein the names of the units do not, in some cases, constitute limitation on the units themselves. the acquisition unit can also be described as: sample set acquire unit.

In another aspect, the present application also provides a computer readable medium which may be included in the electronic apparatus described in the above embodiments, or may also present separately without being assembled into the electronic device. The above computer readable medium carries one or more programs. When the above one or more programs are executed by the apparatus cause the apparatus to: acquire a sample set, wherein samples in the sample set comprise a query information and a clicked first position document and an unclicked second position document in a query result; execute following training steps: for the sample in the sample set, input the query information, the first position document and the second position document in the sample into an initial model, respectively obtain scores of the input documents, and determine a target value of the sample based on the obtained scores, a clicked bias of a first position and an unclicked bias of a second position, wherein the clicked bias and the unclicked bias are respectively used for representing an influence degree of a position of a document in the query result on a clicked probability and an unclicked probability of the document; update the initial model based on the target value of each sample; determine whether the initial model is completely trained; and in response to determining that the initial model is completely trained, determine the updated initial model as a ranking model.

Optionally, when the above one or more programs are executed by the apparatus, the apparatus may also be caused to: after updating the initial model based on the target value of each sample, re-estimate the clicked bias and the unclicked bias of each position based on the updated initial model and the sample set so as to update the clicked bias and the unclicked bias of each position.

Optionally, when the above one or more programs are executed by the apparatus, the apparatus may also be caused to: in response to determining that the initial model is not completely trained, continuously execute the training step by using the updated initial model and the updated clicked bias and the updated unclicked bias of each position.

Optionally, the determine a target value of the sample based on the obtained scores, a clicked bias of a first position and an unclicked bias of a second position comprises: input the obtained scores, the clicked bias of the first position and the unclicked bias of the second position into a pre-established gradient calculation formula, and determine a gradient calculation result as the target value of the sample.

Optionally, the initial model is a decision tree; and the update the initial model based on the target value of each sample comprises: establish the decision tree, and fit the target value of each sample; and update the initial model based on the established decision tree.

Optionally, the determine whether the initial model is completely trained comprises: determine a number of the established decision tree, and compare the number with a preset number; and determine whether the initial model is completely trained according to a comparison result.

Optionally, the determine a target value of the sample based on obtained scores, a clicked bias of a first position and an unclicked bias of a second position comprises: input the obtained scores, the clicked bias of the first position and the unclicked bias of the second position into a pre-established loss function to obtain a loss value, and determine the loss value as the target value of the sample.

Optionally, the determine whether the initial model is completely trained comprises: determine an average value of the target value of each sample, and compare the average value with a preset value; and determine whether the initial model is completely trained according to a comparison result.

In addition, the computer-readable medium with a computer program stored therein, when the program is executed by a processor, the processor is caused to: in response to receiving a query request containing a target query information, retrieve candidate documents matched with the target query information and summarize the candidate documents into a candidate document set; input the candidate documents in the candidate document set into a ranking model generated by the method according to any one of embodiments above to obtain scores of the candidate documents; and rank the candidate documents in the candidate document set according to an order from a large score to a small score, and return a ranking result.

The above description is merely the illustration of preferred embodiments of the present application and the technical principles used. It should be understood by those skilled in the art that the scope of the present application referred to herein is not limited to technical solutions formed by specific combinations of the above technical features, but also contains other technical solutions formed by any combination of the above technical features or equivalent features thereof without departing from the above inventive concept, such as, technical solutions formed by interchanging the above features with (but not limited to) the technical features with similar functions disclosed in the present disclosure.

What is claimed is:

1. A method for generating a ranking model, comprising:
   acquiring a sample set, wherein samples in the sample set comprise a query information and a clicked first position document and an unclicked second position document in a query result;
   executing following training steps: for the samples in the sample set, inputting the query information, the first position document and the second position document in the sample into an initial model, respectively obtaining scores of the input documents, and determining a target value of the sample based on the obtained scores, a clicked bias of a first position and an unclicked bias of a second position, wherein the clicked bias and the unclicked bias are respectively used for representing an influence degree of a position of a document in the query result on a clicked probability and an unclicked probability of the document; updating the initial model based on the target value of each sample; determining whether the initial model is completely trained; and in response to determining that the initial model is completely trained, determining the updated initial model as the ranking model; and
   wherein after the updating the initial model based on the target value of each sample, the training steps further comprise:
   re-estimating the clicked bias and the unclicked bias of each position based on the updated initial model and the sample set so as to update the clicked bias and the unclicked bias of each position.

2. The method for generating a ranking model according to claim 1, wherein the method further comprises:
   in response to determining that the initial model is not completely trained, continuously executing the training step by using the updated initial model and the updated clicked bias and the updated unclicked bias of each position.

3. The method for generating a ranking model according to claim 1, wherein the determining a target value of the sample based on the obtained scores, a clicked bias of a first position and an unclicked bias of a second position comprises:
   inputting the obtained scores, the clicked bias of the first position and the unclicked bias of the second position into a pre-established gradient calculation formula, and determining a gradient calculation result as the target value of the sample.

4. The method for generating a ranking model according to claim 3, wherein the initial model is a decision tree; and the updating the initial model based on the target value of each sample comprises:
   establishing the decision tree, and fitting the target value of each sample; and updating the initial model based on the established decision tree.

5. The method for generating a ranking model according to claim 4, wherein the determining whether the initial model is completely trained comprises:

determining a number of the established decision tree, and comparing the number with a preset number; and determining whether the initial model is completely trained according to a comparison result.

6. The method for generating a ranking model according to claim 1, wherein the determining a target value of the sample based on obtained scores, a clicked bias of a first position and an unclicked bias of a second position comprises:

inputting the obtained scores, the clicked bias of the first position and the unclicked bias of the second position into a pre-established loss function to obtain a loss value, and determining the loss value as the target value of the sample.

7. The method for generating a ranking model according to claim 6, wherein the determining whether the initial model is completely trained comprises:

determining an average value of the target value of each sample, and comparing the average value with a preset value; and determining whether the initial model is completely trained according to a comparison result.

8. A device for generating a ranking model, comprising:
at least one processor; and
at least one memory communicatively coupled to the at least one processor and storing instructions that upon execution by the at least one processor cause the device to:

acquire a sample set, wherein samples in the sample set comprises a query information and a clicked first position document and an unclicked second position document in a query result;

execute following training steps: for the sample in the sample set, input the query information, the first position document and the second position document in the sample into an initial model, respectively obtain scores of the input documents, and determine a target value of the sample based on the obtained scores, a clicked bias of a first position and an unclicked bias of a second position, wherein the clicked bias and the unclicked bias are respectively used for representing an influence degree of a position of a document in the query result on a clicked probability and an unclicked probability of the document; update the initial model based on the target value of each sample; determine whether the initial model is completely trained; and in response to determining that the initial model is completely trained, determine the updated initial model as the ranking model; and wherein the at least one memory further stores instructions that upon execution by the at least one processor cause the device to:

after updating the initial model based on the target value of each sample, re-estimate the clicked bias and the unclicked bias of each position based on the updated initial model and the sample set so as to update the clicked bias and the unclicked bias of each position.

9. The device for generating a ranking model according to claim 8, wherein the at least one memory further stores instructions that upon execution by the at least one processor cause the device to:

in response to determining that the initial model is not completely trained, continuously execute the training step by using the updated initial model and the updated clicked bias and the updated unclicked bias of each position.

10. The device for generating a ranking model according to claim 8, wherein the at least one memory further stores instructions that upon execution by the at least one processor cause the device to:

input the obtained scores, the clicked bias of the first position and the unclicked bias of the second position into a pre-established gradient calculation formula, and determine a gradient calculation result as the target value of the sample.

11. The device for generating a ranking model according to claim 10, wherein the initial model is a decision tree; and the at least one memory further stores instructions that upon execution by the at least one processor cause the device to:

establish the decision tree, and fit the target value of each sample; and update the initial model based on the established decision tree.

12. The device for generating a ranking model according to claim 11, wherein the at least one memory further stores instructions that upon execution by the at least one processor cause the device to:

determine a number of the established decision tree, and compare the number with a preset number; and determine whether the initial model is completely trained according to a comparison result.

13. The device for generating a ranking model according to claim 8, wherein the at least one memory further stores instructions that upon execution by the at least one processor cause the device to:

input the obtained scores, the clicked bias of the first position and the unclicked bias of the second position into a pre-established loss function to obtain a loss value, and determine the loss value as the target value of the sample.

14. The device for generating a ranking model according to claim 13, wherein the at least one memory further stores instructions that upon execution by the at least one processor cause the device to:

determine an average value of the target value of each sample, and compare the average value with a preset value; and determine whether the initial model is completely trained according to a comparison result.

15. A method for generating information, comprising:

in response to receiving a query request containing a target query information, retrieving candidate documents matched with the target query information and summarizing the candidate documents into a candidate document set;

inputting the candidate documents in the candidate document set into a ranking model to obtain scores of the candidate documents; and ranking the candidate documents in the candidate document set according to an order from a large score to a small score, and returning a ranking result; wherein the ranking model is generated by: acquiring a sample set, wherein samples in the sample set comprise a query information and a clicked first position document and an unclicked second position document in a query result; executing following training steps: for the samples in the sample set, inputting the query information, the first position document and the second position document in the sample into an initial model, respectively obtaining scores of the input documents, and determining a target value of the sample based on the obtained scores, a clicked bias of a first position and an unclicked bias of a second position, wherein the clicked bias and the unclicked bias are respectively used for representing an influence degree of a position of a document in the query result on a clicked probability and an unclicked probability of the document; updating the initial model based on the target value of each sample; determining whether the initial model is completely trained; and in response to determining that the initial model is completely trained, determining the updated initial model as the ranking model; and wherein after the updating the initial model based on the target value of each sample, the training steps further comprise:

re-estimating the clicked bias and the unclicked bias of each position based on the updated initial model and the sample set so as to update the clicked bias and the unclicked bias of each position.

\* \* \* \* \*